United States Patent
Ramos

(10) Patent No.: US 9,392,555 B2
(45) Date of Patent: Jul. 12, 2016

(54) POWER CONTROLLER, METHOD, COMPUTER PROGRAM AND COMPUTER PROGRAM PRODUCT FOR CONTROLLING TRANSMISSION POWER

(75) Inventor: Edgar Ramos, Espoo (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 117 days.

(21) Appl. No.: 14/348,925

(22) PCT Filed: Oct. 6, 2011

(86) PCT No.: PCT/SE2011/051198
§ 371 (c)(1),
(2), (4) Date: Apr. 1, 2014

(87) PCT Pub. No.: WO2013/051973
PCT Pub. Date: Apr. 11, 2013

(65) Prior Publication Data
US 2014/0241304 A1    Aug. 28, 2014

(51) Int. Cl.
*H04W 52/36* (2009.01)
*H04W 72/04* (2009.01)
*H04W 52/24* (2009.01)

(52) U.S. Cl.
CPC ........ *H04W 52/365* (2013.01); *H04W 72/0473* (2013.01); *H04W 52/241* (2013.01); *H04W 52/367* (2013.01)

(58) Field of Classification Search
None
See application file for complete search history.

(56) References Cited

U.S. PATENT DOCUMENTS

| 6,597,923 B1 * | 7/2003 | Vanghi | H04W 52/12 370/342 |
| 2002/0160799 A1 * | 10/2002 | Kanemoto | H04W 52/12 455/522 |
| 2004/0005906 A1 * | 1/2004 | Okumura | H04W 52/50 455/522 |

(Continued)

FOREIGN PATENT DOCUMENTS

| CN | WO 2009126075 A1 * | 10/2009 | H04B 1/7097 |
| EP | 1 133 070 A2 | 9/2001 | |

(Continued)

OTHER PUBLICATIONS

Extended European Search Report for Application No./Patent No. 11873780.8-1855/2749093 PCT/SE2011051198, Mar. 9, 2015.

(Continued)

*Primary Examiner* — Chi H Pham
*Assistant Examiner* — Vladislav Aguryev
(74) *Attorney, Agent, or Firm* — Patent Portfolio Builders, PLLC

(57) ABSTRACT

A power controller is presented, arranged to control transmission power of at least one mobile communication terminal of a cell of a mobile communication network. The power controller comprises: a candidate maximum signal to interference ratio, SIR, calculator, arranged to calculate a candidate maximum SIR based on a current headroom value, the headroom value being an indicator of how much the transmission power of the at least one mobile communication terminal is allowed to increase in the cell; and a SIR determiner arranged to determine a maximum SIR for the at least one mobile communication terminal based on the candidate maximum SIR.

8 Claims, 5 Drawing Sheets

(56) References Cited

U.S. PATENT DOCUMENTS

| | | | |
|---|---|---|---|
| 2004/0038699 A1* | 2/2004 | Toono | H04W 52/12 455/522 |
| 2004/0066795 A1* | 4/2004 | Zhang | H04W 52/54 370/442 |
| 2004/0203993 A1* | 10/2004 | Tanoue | H04W 52/12 455/522 |
| 2005/0176457 A1 | 8/2005 | Shinozaki | |
| 2006/0252451 A1 | 11/2006 | Cho et al. | |
| 2007/0173279 A1* | 7/2007 | Kuroda | H04W 52/12 455/522 |
| 2008/0009306 A1* | 1/2008 | Suga | H04W 52/10 455/522 |
| 2011/0044263 A1 | 2/2011 | El-saidny | |
| 2011/0237292 A1* | 9/2011 | Fujii | H04W 52/12 455/522 |

FOREIGN PATENT DOCUMENTS

| | | | |
|---|---|---|---|
| EP | 1 912 345 A1 | 4/2008 | |
| EP | 2 627 132 | 8/2013 | |
| SE | WO 2009068077 A1 * | 6/2009 | ............ H04W 52/12 |
| WO | WO 2009/068077 A1 | 6/2009 | |
| WO | WO 2011/119080 A1 | 9/2011 | |
| WO | WO 2012/046657 | 4/2012 | |

OTHER PUBLICATIONS

International Search Report for International Application No. PCT/SE2011/051198, May 25, 2012.

PCT International Report on Patentability for International Application No. PCT/SE2011/051198.

* cited by examiner

| 50 Granted ETFC (kbps) | 52 Lower max SIR (dB) | 52 Higher max SIR (dB) |
|---|---|---|
| 160 | 6 | 16 |
| 320 | 8 | 16 |
| ... | | |

POWER CONTROLLER, METHOD, COMPUTER PROGRAM AND COMPUTER PROGRAM PRODUCT FOR CONTROLLING TRANSMISSION POWER

PRIORITY

This nonprovisional application is a U.S. National Stage Filing under 35 U.S.C. §371 of International Patent Application Serial No. PCT/SE2011/051198, filed Oct. 6, 2011 and entitled "Power Controller, Method, Computer Program and Computer Program Product for Controlling Transmission Power."

TECHNICAL FIELD

The invention relates generally to mobile communication networks, and more particularly to power control in mobile communication networks.

BACKGROUND

In cellular networks, such as networks complying with the UMTS (Universal Mobile Telecommunications System) standard, more and more traffic is due to data traffic.

Using EUL (enhanced uplink), capacity is increased and delay is reduced. EUL uses E-DCH (enhanced dedicated channel) for uplink transmission. E-DCH operates by deploying non-orthogonal transmissions, which has the effect of limiting the number of users that a cell can support in terms of performance and stability, due to the interference generated by the concurrent non-orthogonal transmissions.

There is thus a problem of how to increase throughput in such situations.

In order to control the interference, the radio base stations, also known as NodeBs, can implement a load estimation function. The load estimation function may predict the load of a user based in his SIR (signal to interference ratio) and granted ETFC (Enhanced Uplink Transport Format Combination) rate and feed that information back to a scheduler function in the NodeB. The scheduler function decides what grant rate to give to the user based on the load and the user requested rate.

However, capacity is always short and there is a perpetual need to further increase capacity and efficiency of transmission.

SUMMARY

An object of the invention is to provide a power controller, a method, a computer program and a computer program product to increase cell capacity for EUL throughput.

In a first aspect, it is presented a power controller arranged to control transmission power of at least one mobile communication terminal of a cell of a mobile communication network. The power controller comprises: a candidate maximum signal to interference ratio, SIR, calculator, arranged to calculate a candidate maximum SIR based on a current headroom value, the headroom value being an indicator of how much the transmission power of the at least one mobile communication terminal is allowed to increase in the cell; and a SIR determiner arranged to determine a maximum SIR for the at least one mobile communication terminal based on the candidate maximum SIR. By taking headroom into account, a better utilization of the power is achieved. This results in higher throughput in the cell, through the dynamic adjustment of SIR.

The power controller may further comprise: a configuration obtainer, arranged to read a range, including an upper and a lower limit, of an allowed maximum SIR; and wherein the SIR determiner is arranged to determine a maximum SIR based on the candidate maximum SIR and the range of allowed maximum SIR, such that the maximum SIR is determined to be the candidate maximum SIR when the candidate maximum SIR is within the configured range of allowed maximum SIR, and the maximum SIR is determined to be a value of the range of allowed maximum SIR which is closest to the candidate maximum SIR when the candidate maximum SIR is outside the configured range of allowed maximum SIR. This prevents the SIR from going too high to disturb other uplink channels and from going too low to thereby risk lower distinguishability at the receiver of the radio base station.

A second aspect is a radio base station comprising the power controller according to the first aspect.

A third aspect is a radio network controller arranged to manage a plurality of base stations, wherein the radio network controller comprises the power controller according to the first aspect.

A fourth aspect is a method for controlling transmission power of at least one mobile communication terminal of a cell of a mobile communication network, the method being performed in a power controller. The method comprises the steps of: calculating a candidate maximum signal to interference ratio, SIR, taking into account a current headroom value, the headroom value being an indicator of how much transmission power of mobile communication terminals is allowed to increase in a radio cell; and determining a maximum SIR for the at least one mobile communication terminal based on the candidate maximum SIR.

The step of determining a maximum SIR may comprise the sub-steps of: reading a configured range, including an upper and lower limit, of allowed maximum SIR; when the candidate maximum SIR is inside the configured range of allowed maximum SIR, determining a maximum SIR to be the candidate maximum SIR; and when the candidate maximum SIR is outside the configured range of allowed maximum SIR, determining a maximum SIR to be a value of the range of allowed maximum SIR which is closest to the candidate maximum SIR.

The step of calculating a candidate maximum SIR may also take into account an orthogonality factor, the orthogonality factor indicating distinguishability of a mobile communication terminal.

The step of calculating a candidate maximum SIR may also take into account currently used transmission powers of each one of the at least one mobile communication terminal.

The method may be repeated.

The step of calculating a candidate maximum SIR may also take into account a receiver loss parameter, indicating a signal loss in a receiver of the fixed node.

A fifth aspect is a computer program for controlling transmission power of at least one mobile communication terminal of a cell of a mobile communication network. The computer program comprises computer program code which, when run on a power controller, causes the power controller to: calculate a candidate maximum signal to interference ratio, SIR, taking into account a current headroom value, the headroom value being an indicator of how much transmission power of mobile communication terminals is allowed to increase in a radio cell; and determine a maximum SIR for the at least one mobile communication terminal based on the candidate maximum SIR.

A sixth aspect is a computer program product comprising a computer program according to claim 11 and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
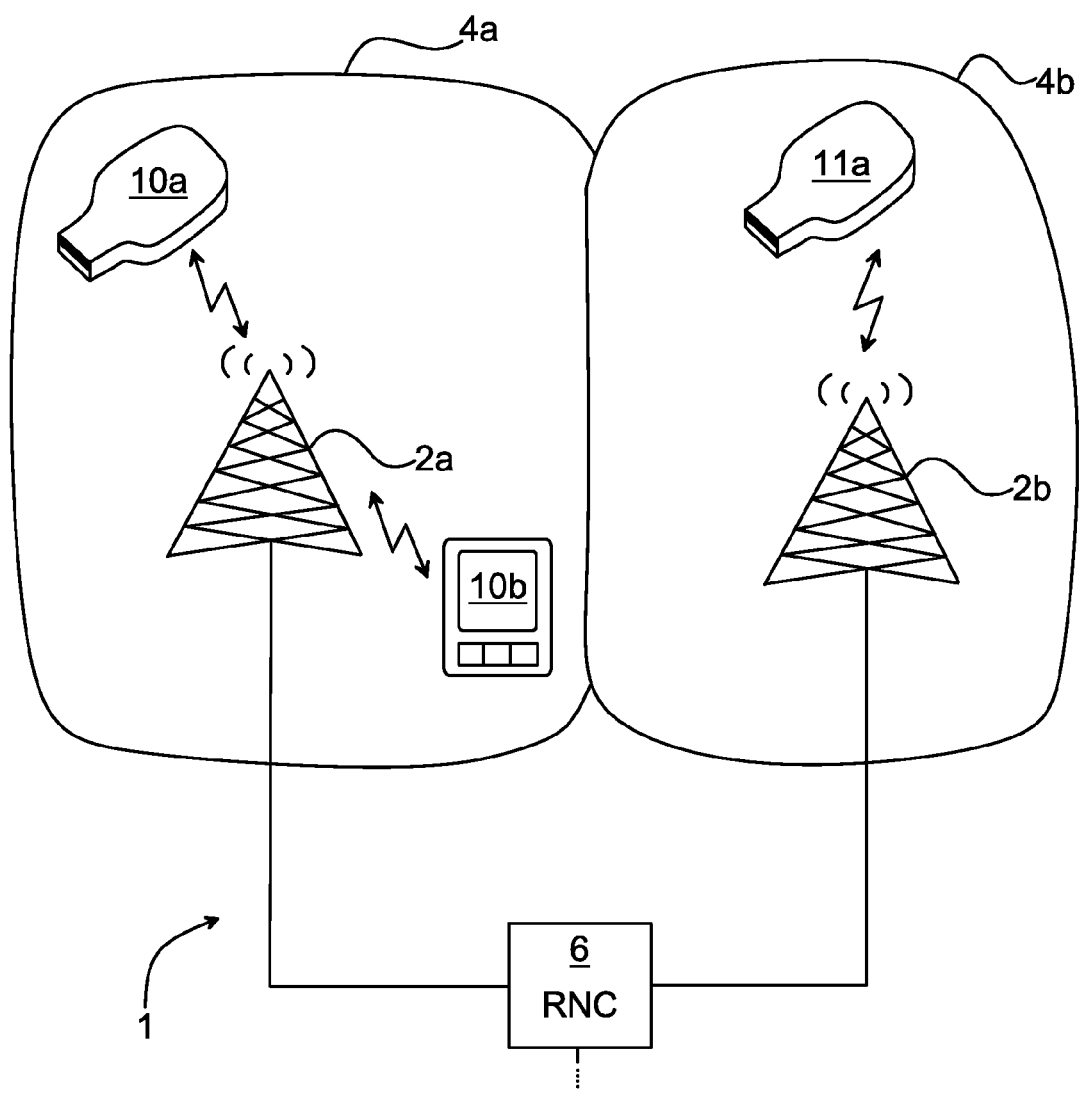
FIG. 1 is a schematic diagram illustrating an environment where embodiments as described herein can be applied.

FIG. 1 is a schematic diagram illustrating an environment where embodiments as described herein can be applied. A mobile communication network 1 comprises a radio network controller (RNC) 6 and two radio base stations 2a, 2b, responsible for respective radio cells 4a, 4b. In this example, a first base station 2a is connected via wireless communication to mobile communication terminals 10a, 10b. One mobile communication terminal 10a is in the form of a modem for a computer while the second mobile communication terminal 10b is in the form of a self contained mobile communication terminal. The second mobile communication terminal 10b can optionally function as a modem to a computer, whereby it can perform the same functions as the first mobile communication terminal 10a. In this example, a second radio base station 2b is connected to a third mobile communication terminal 11a.

While the radio base stations 2a, 2b here are shown to have one cell 4a, 4b each, each radio base station 4a-b can optionally have multiple cells, such as two, three or more cells. Different radio base stations can have different number of cells.

Only two radio base stations 2a, 2b are shown in this example for reasons of clarity. However, as the skilled person would realise, the mobile communication network 1 can include any suitable number of radio base stations. Furthermore, nodes and components of the mobile communication network 1 which are not needed to explain the concept of the embodiments herein are omitted for reasons of clarity.

The mobile communication network 1 can be any mobile communication network benefiting from the novel and inventive ideas presented herein. For example, the mobile communication network can comply with the standards of UMTS (Universal Mobile Telecommunications System) or CDMA2000 (Code Division Multiple Access 2000).

It is to be noted that the term mobile communication terminal is used to denote any client in a mobile communication network, including, but not limited to, user equipment, mobile client, mobile station, etc.

Figure 2:
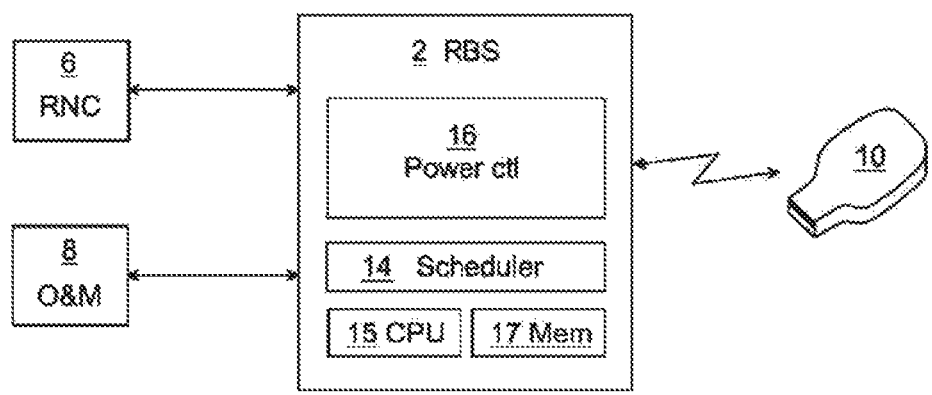
FIG. 2 is a schematic diagram illustrating some components of an embodiment of a radio base station of FIG. 1.

FIG. 2 is a schematic diagram illustrating an embodiment of a radio base station 2 which can be any one of the radio base stations 2a, 2b shown in FIG. 1. The radio base station 2 comprises a scheduler 14 for granting uplink rates from mobile communication terminals, and a power controller 16 which will be described in more detail below. The power controller 16 and the scheduler 14 are modules which can be implemented using software and/or hardware. The scheduler 14 can implement the enhanced uplink scheduler functionality of the EUL (Enhanced Uplink) standard of 3GPP (3rd Generation Partnership Project).

A controller 15 is provided using any suitable central processing unit (CPU), microcontroller, digital signal processor (DSP), etc., capable of executing software instructions stored in a computer program product 17 e.g. in the form of a memory. The computer program product 17 can be a memory or any combination of read and write memory (RAM) and read only memory (ROM). The memory also comprises persistent storage, which, for example, can be any single one or combination of magnetic memory, optical memory, or solid state memory or even remotely mounted memory.

The radio base station 2 is connected to a radio network controller 6 and an operation and maintenance system 8. Furthermore, the radio base station 2 can be in wireless contact with one or more mobile communication terminals 10. As will be explained in more detail below, the radio base station 2 can be configured to set a maximum SIR target based on currently headroom in the cell.

Figure 3:
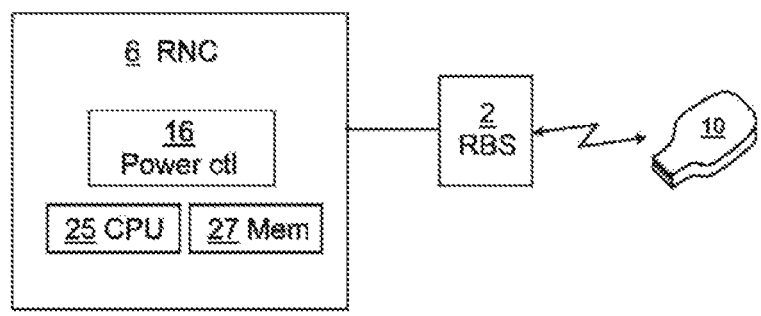
FIG. 3 is a schematic diagram illustrating some components of an embodiment of a radio network controller of FIG. 1.

FIG. 3 is a schematic diagram illustrating an embodiment of a radio network controller 6 which can be part of FIG. 1. The radio network controller 6 comprises the power controller 16 which was part of the radio base station 2 of FIG. 2.

A controller 25 is provided using any suitable central processing unit (CPU), microcontroller, digital signal processor (DSP), etc., capable of executing software instructions stored in a computer program product 27 e.g. in the form of a memory. The computer program product 27 can be a memory or any combination of read and write memory (RAM) and read only memory (ROM). The memory also comprises persistent storage, which, for example, can be any single one or combination of magnetic memory, optical memory, or solid state memory or even remotely mounted memory.

The radio network controller 6 is connected to one or more radio base stations 2 which in turn are connected to one or more mobile communication terminals 10. As will be explained in more detail below, the radio network controller 6 can set a maximum SIR target per cell based on currently available headroom in the cell.

Here now follows a general discussion of how cell capacity and SIR are related embodiments herein.

The EUL cell capacity is dependent on the power transmitted by the mobile communication terminals in the cell. The power is related to the uplink DPCCH (dedicated physical control channel) SIR target for the mobile communication terminal, and the power transmitted on the E-DPDCH (enhanced dedicated physical data channel) and the uplink control channels such as E-DPCCH (enhanced dedicated physical control channel), HS-DPCCH (high-speed dedicated physical control channel).

If a SIR target for a mobile communication terminal is increased, the radio base station receives a stronger signal which initially allows for a decreased error rate. However, other mobile communication terminals in the cell may have to increase their power in order to achieve their SIR target, whereby an increased SIR target may actually result in a lower throughput of the cell. On the other hand, if a SIR target is decreased below a certain level, error rate can increase due to the signal not being sufficiently distinguishable in the receiver of the radio base station. It is thus a realisation that it is beneficial to provide limit maximum SIR values to be within a configurable range.

The SIR target of a user in the prior art is controlled by outer-loop power control (OLPC). OLPC is typically located in the RNC since the RNC controls the SIR target in more than one RBS when a user is in soft-handover. However, this is not theoretically limited to RNC. The RNC can also set the maximum SIR target for a given radio access bearer, which may have to be set to a high value to support the peak rate, since required SIR target typically increases with increased rate when a low number of re-transmissions is targeted.

The inner loop power control is performed at the RBS to control the power of each of its mobile communication terminals being located in any of its radio cells. One task in the inner loop power control is to measure the SIR for each mobile communication terminal at the RBS and control the transmission power of each instance of the respective mobile communication terminals to reach the SIR target received from the outer loop control.

As described herein, the idea here is to have the ability to limit the maximum SIR to a configured target for mobile communication terminals depending on dynamic factors, such as available headroom. In one embodiment, the maximum SIR is kept within a configured range. In embodiments described herein, the outer loop power control is limited to a configured SIR target, typically for each cell, depending on granted data rate and/or the number of mobile communication terminals. This limitation can be calculated at the RNC or RBS and is applied at the RBS.

Figure 4:
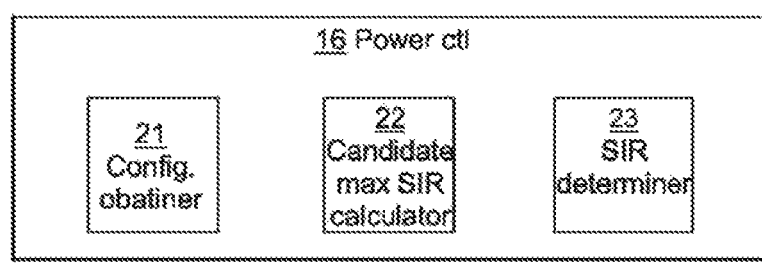
FIG. 4 is a schematic diagram illustrating some components of an embodiment of the power controller of FIG. 2 or 3.

FIG. 4 is a schematic diagram illustrating some modules of the power controller 16 of FIG. 2 or 3. The modules can be implemented using hardware and/or software such as a computer program executing in the RBS 2 or RNC 6 of FIGS. 1-3. The modules can utilise an execution environment (such as the controller 15 or 25 and computer program product 17 or 27 of FIG. 2 or 3, respectively). The modules correspond to respective steps of the method illustrated in FIGS. 6A-B.

Figures 5, 6A:
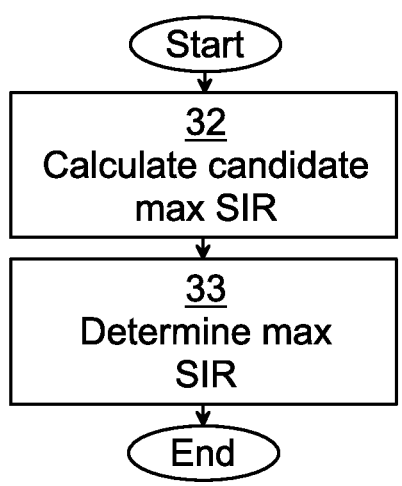
FIG. 5 is a table illustrating how the maximum SIR target can be configured depending on granted ETFC.
FIG. 6A is a flow chart illustrating a method according to one embodiment executed in the radio base station or in the radio network controller of FIGS. 1-3.

A configuration obtainer 21 is arranged to read a range, including an upper limit and a lower limit, of an allowed maximum SIR. An example of a corresponding configuration table is shown in FIG. 5. This module corresponds to a read config step 30 of FIG. 6B, described in more detail below.

A candidate maximum SIR calculator 22 is arranged to calculate a candidate maximum SIR based on a current headroom value. The headroom value is an indicator of how much the transmission power of mobile communication terminals in the cell in question is allowed to increase. This calculation is exemplified in more detail below with reference to a calculate candidate max SIR step 32 of FIG. 6A.

A SIR determiner 23 is arranged to determine the maximum SIR for one or more mobile communication terminals based on the candidate maximum SIR, e.g. using the range obtained by the configuration obtainer 21. This determination is exemplified in more detail with reference to the determine max SIR step 33 of FIGS. 6A-B.

FIG. 5 shows a table illustrating the configuration of maximum SIR target to be used for various granted ETFC. This table is a look-up table with a column 50 for granted ETFC, used for reading corresponding values for a lower limit found in a column 52 for lower max SIR and a higher limit found in a column 54 for higher max SIR. The ETFC column 50 has the unit of kpbs, the lower and higher maximum SIR columns 52, 54 have the unit of dB. The look-up table is thus used to determine a range of allowable maximum SIR values based on granted ETFC values.

Optionally, the configuration can also depend on whether the mobile communication terminal in question is in handover or not.

FIG. 6A is a flow chart illustrating a method according to one embodiment executed in the radio base station 2a, 2b or in the radio network controller 6 of FIGS. 1-3.

In an initial calculate candidate maximum SIR step 32, a candidate maximum SIR is calculated while considering dynamic aspects of the cell. In one embodiment, this calculation is based on a current headroom value, as illustrated in one example below.

Optionally, other factors, such as an orthogonality factor can also be considered in this calculation.

Here now follows one example of how the candidate maximum SIR can be calculated.

The candidate maximum SIR is determined to be a value which is possible to use without creating an overload for the given user. The candidate maximum SIR or "ideal SIR" can be calculated according to the following:

$$\text{candidate max } SIR = \frac{\max CIR}{K \cdot \sum \beta_{(E-DCH)}} \quad (1)$$

where max CIR (carrier to interference ratio) can be calculated using equation (2), K can be calculated using equation (3) and $\Sigma\beta_{(E-DCH)}$ can be calculated using equation (4).

The max CIR can be calculated according to:

$$\max CIR = \frac{AvailableHeadRoom}{1 - ((1 - \alpha_k) \cdot AvailableHeadRoom)} \quad (2)$$

where $\alpha$ is an orthogonality factor between 0 and 1, and AvailableHeadRoom is an indicator of how much transmission power is allowed to increase in the cell.

K can be calculated according to:

$$K = \frac{ReceiverLoss}{DiversityGain * SpreadingFactor_{DPCCH}} \quad (3)$$

where ReceiverLoss is a measurement or estimation of losses in the receiver in the RBS in dB, and DiversityGain is a measurement or estimation indicating how well signals can be separated. The DiversityGain has a value of 1 or more and depends on, among other factors, the number of antennas in the base station. The term SpreadingFactor$_{DPCCH}$ is a configured value in the RBS, typically being two to the power of an integer, e.g. 2^8, i.e. 256.

$\Sigma_{(E-DCH)}$ can be calculated according to:

$$\sum \beta_{(E-DCH)} = \left(\left(\frac{\beta_{ed}}{\beta_c}\right)^2 \cdot numofcodes\right) + \left(\frac{\beta_{ec}}{\beta_c}\right)^2 \quad (4)$$

where the beta values are power offsets relative to the granted ETFC. All beta values are values sent over the signal network to the mobile communication terminal and indicate power offset relative to the control channel. The beta values are used to calculate the power offset of the E-DPDCH over the DPCCH power (which is power controlled) and the power offset generally increases when the throughput increase. These values can be semi static and may be updated not so often. $\beta_{(E-DCH)}$ represents the power offset of E-DCH (enhanced dedicated channel) and no other channels of one specific terminal. $\beta_{ed}$ represents the beta value only for the data part (no control channel) of the granted ETFC and $\beta_c$ is the beta value for DPCCH (dedicated physical control channel). Finally, $\beta_{ec}$ represents the beta value for the control channel (E-DPCCH). The numofcodes term represents the number of codes required to transmit the granted ETFC.

The method then continues to a determine maximum SIR step 33. Here, the maximum SIR is determined from the candidate SIR. This can for example be to limit the maximum SIR to a maximum level or to ensure the maximum SIR is within a configured range for a particular ETFC rate. The maximum SIR is effected by the RBS, by ensuring that any SIR targets that are sent to the mobile communication terminal do not exceed the maximum SIR.

Figure 6B:
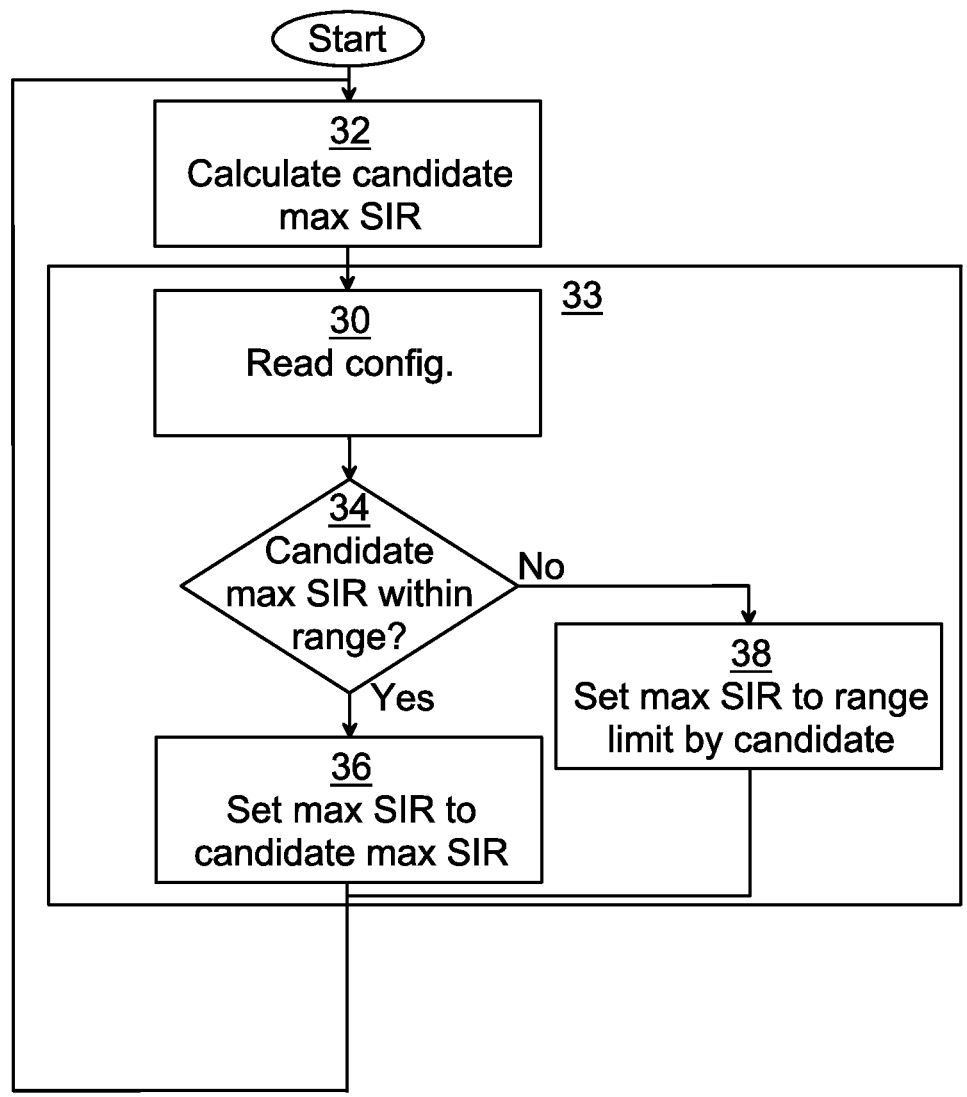
FIG. 6B is a flow chart illustrating a method according to another embodiment executed in the radio base station or in the radio network controller of FIGS. 1-3, and FIG. 7 schematically shows one example of a computer program product comprising computer readable means.

FIG. 6B is a flow chart illustrating a method according to one embodiment executed in the radio base station 2a, 2b or in the radio network controller 6 of FIGS. 1-3. The step of calculating maximum SIR 32 correspond to that explained with reference to FIG. 6A above and will not be explained again for FIG. 6B.

In this embodiment, the determine max SIR step 33 comprises four sub-steps. A first sub-step is a read config sub-step 30. In this step a configuration comprising a range of allowed maximum SIR values is read, e.g. from the table disclosed in FIG. 5. The range comprises an upper and lower limit of allowed maximum SIR values.

In a conditional sub-step candidate max SIR within range sub-step 34, it is checked whether the calculated candidate maximum SIR is within the range of the allowed maximum SIR values. If this is the case, the method proceeds to a set max SIR to candidate max SIR sub-step 36. Otherwise, the method proceeds to a set max SIR to range limit by candidate sub-step 38.

In the set max SIR to candidate max SIR sub-step 36, the maximum SIR is set to be the value of the candidate maximum SIR.

In the set max SIR to range limit by candidate sub-step 38, the maximum SIR is set to be the limit of the range which is closest to the candidate maximum SIR. For example, if the range of allowed maximum SIR values spans from 6 to 10, and the candidate maximum SIR is 5, then the maximum SIR is set to be 6, which is the value within the range that is closest to the candidate maximum SIR value of 5. On the other hand, if the range of allowed maximum SIR values spans from 6 to 10, and the candidate maximum SIR is 20, then the maximum SIR is set to be 10, which is the value within the range that is closest to the candidate maximum SIR value of 20.

The sub-steps of the determine maximum SIR step 33 disclosed here where the candidate maximum SIR is kept within a configured range. This prevents the SIR from going too high to disturb other uplink channels and from going too low to thereby risk lower distinguishability at the receiver of the radio base station.

After the set max SIR to candidate max SIR sub-step 36, the method is repeated, e.g. every 10 ms. or every 2 ms.

Figure 7:
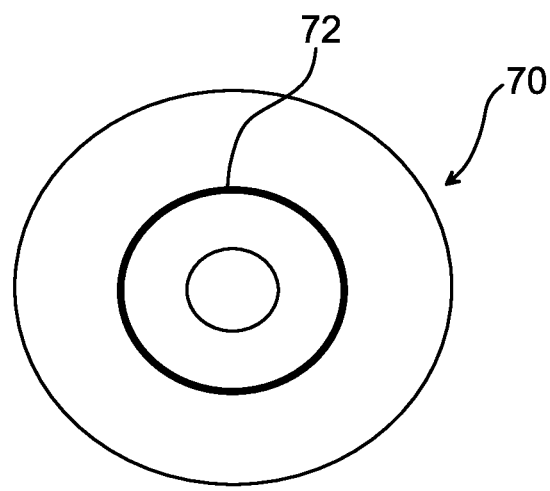

FIG. 7 schematically shows one example of a computer program product 70 comprising computer readable means 72. On this computer readable means 72, a computer program can be stored, which computer program can cause a computer to execute the method according to embodiments described herein. In this example, the computer program product is an optical disc, such as a CD (compact disc), a DVD (digital versatile disc) or a Blu-ray disc. The computer readable means can also be solid state memory, such as flash memory or a software package distributed over a network, such as the Internet.

It is to be noted that the maximum SIR targets determined as described herein can be DPCCH SIR targets, e.g. in an EUL system.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A hardware and software power controller arranged to control transmission power of at least one mobile communication terminal of a cell of a mobile communication network, the power controller comprising:
    a configuration obtainer arranged to read a configured range, including an upper and a lower limit, of an allowed maximum signal to interference ratio, SIR;
    a candidate maximum SIR calculator arranged to calculate a candidate maximum SIR based on a current headroom value, the headroom value being an indicator of how much the transmission power of the at least one mobile communication terminal is allowed to increase in the cell; and
    a SIR determiner arranged to determine a maximum SIR for the at least one mobile communication terminal based on the candidate maximum SIR and the configured range of the allowed maximum SIR, such that the maximum SIR is determined to be the candidate maximum SIR when the candidate maximum SIR is within the configured range of the allowed maximum SIR, and the maximum SIR is determined to be a value of the configured range of the allowed maximum SIR which is closest to the candidate maximum SIR when the candidate maximum SIR is outside the configured range of the allowed maximum SIR, wherein the hardware and software power controller is arranged to control the transmission power of the at least one mobile communication terminal based on the determined maximum SIR.

2. A radio base station comprising the hardware and software power controller according to claim 1.

3. A radio network controller arranged to manage a plurality of base stations, wherein the radio network controller comprises the hardware and software power controller according to claim 1.

4. A method for controlling transmission power of at least one mobile communication terminal of a cell of a mobile communication network, the method being performed in a hardware and software power controller and comprising the steps of:
   reading a configured range, including an upper and lower limit, of an allowed maximum signal to interference ration, SIR;
   calculating a candidate maximum SIR taking into account a current headroom value, the headroom value being an indicator of how much transmission power of mobile communication terminals is allowed to increase in a radio cell;
   determining a maximum SIR for the at least one mobile communication terminal based on the candidate maximum SIR, when the candidate maximum SIR is inside the configured range of the allowed maximum SIR, determining the maximum SIR to be the candidate maximum SIR and when the candidate maximum SIR is outside the configured range of the allowed maximum SIR, determining the maximum SIR to be a value of the configured range of the allowed maximum SIR which is closest to the candidate maximum SIR; and
   controlling the transmission power of the at least one mobile communication terminal based on the determined maximum SIR.

5. The method according to claim 4, wherein the step of calculating the candidate maximum SIR also takes into account an orthogonality factor, the orthogonality factor indicating distinguishability of the at least one mobile communication terminal.

6. The method according to claim 4, wherein the step of calculating the candidate maximum SIR also takes into account currently used transmission powers of each one of the at least one mobile communication terminal.

7. The method according to claim 4, wherein the steps of reading, calculating, and determining are repeated.

8. The method according to claim 4, wherein the step of calculating the candidate maximum SIR also takes into account a receiver loss parameter, indicating a signal loss in a receiver of a fixed node.

* * * * *